United States Patent [19]

Smithson et al.

[11] 3,911,971
[45] Oct. 14, 1975

[54] METHOD AND APPARATUS FOR EXCHANGING CATALYST IN A CATALYTIC CONVERTER

[75] Inventors: Harold R. Smithson, Westtown; Jerry Allen Stirton, West Chester, both of Pa.

[73] Assignee: Oxy-Catalyst, Incorporated, West Chester, Pa.

[22] Filed: Mar. 8, 1974

[21] Appl. No.: 449,456

Related U.S. Application Data

[63] Continuation of Ser. No. 240,969, April 4, 1972, abandoned.

[52] U.S. Cl. .......................... 141/1; 141/65; 141/67
[51] Int. Cl.² ............................................. B65B 1/04
[58] Field of Search ............. 23/288 F; 141/11, 1, 7, 141/8, 65, 66, 67; 184/1.5

[56] References Cited
UNITED STATES PATENTS

| | | | |
|---|---|---|---|
| 1,305,735 | 6/1919 | Morris | 184/1.5 |
| 2,603,312 | 7/1952 | Tabet | 184/1.5 |
| 3,062,590 | 11/1962 | Turner et al. | 141/66 |
| 3,186,804 | 6/1965 | Fisher | 23/288 F |
| 3,216,527 | 11/1965 | Lewis | 184/1.5 |
| 3,295,565 | 1/1967 | Grandy | 141/67 |

*Primary Examiner*—Houston S. Bell, Jr.

[57] ABSTRACT

A system for emptying and refilling a catalytic exhaust purifier for an internal combustion engine comprises a shell having a pair of grids therein defining a catalyst pellet area through which flow the exhaust gases from the internal combustion engine. The pellet bed area has a fill port which is normally closed by a fill plug. When, after use, the catalyst pellets become contaminated and ineffective and require replacing, the fill plug is removed and a tubular wand is inserted through the hole previously occupied by the fill plug. A negative pressure is applied through the wand to the pellet bed area and contaminated pellets are sucked out through the wand into a collection canister until the bed area is empty. To refill the bed area, an adapter having an opening therethrough is inserted into the tail pipe of the exhaust system. The wand is removed from the adapter of the first line and the line is transferred from the fill port with the adapter being connected to the exhaust adapter. A fill adapter is inserted into the fill plug and a second line is connected to the fill adapter. The opposite end of the second line is inserted in a supply of fresh catalyst. Negative pressure is applied through the first line to the exhaust pipe which sucks the fresh catalyst pellets from the supply of fresh catalyst, through the second line into the catalyst bed. A vibrator may preferably be attached to the shell of the purifier to assist in the extraction of the contaminated pellets and to assist in distributing the fresh pellets as they are pulled by suction into the bed area.

10 Claims, 3 Drawing Figures

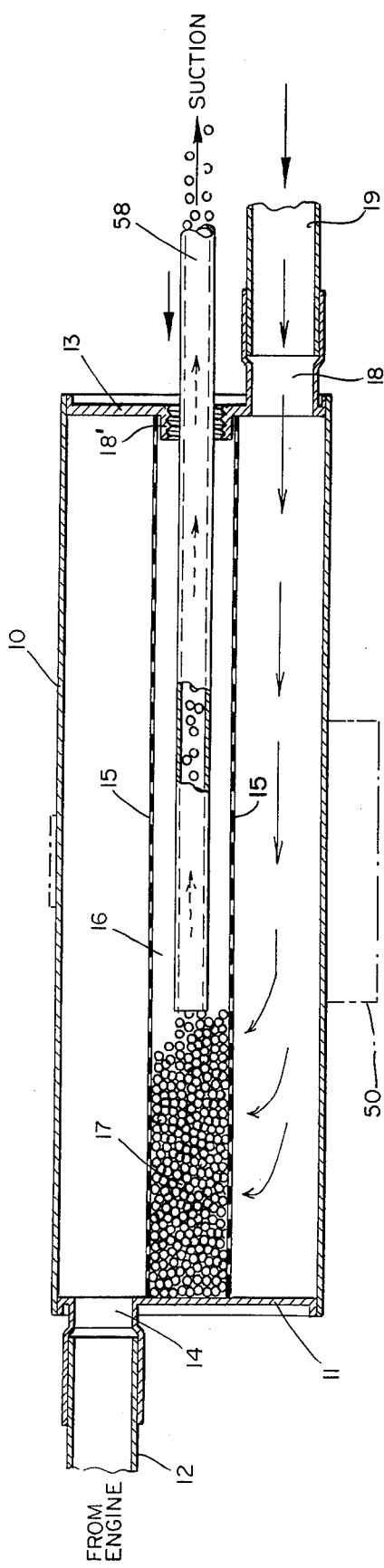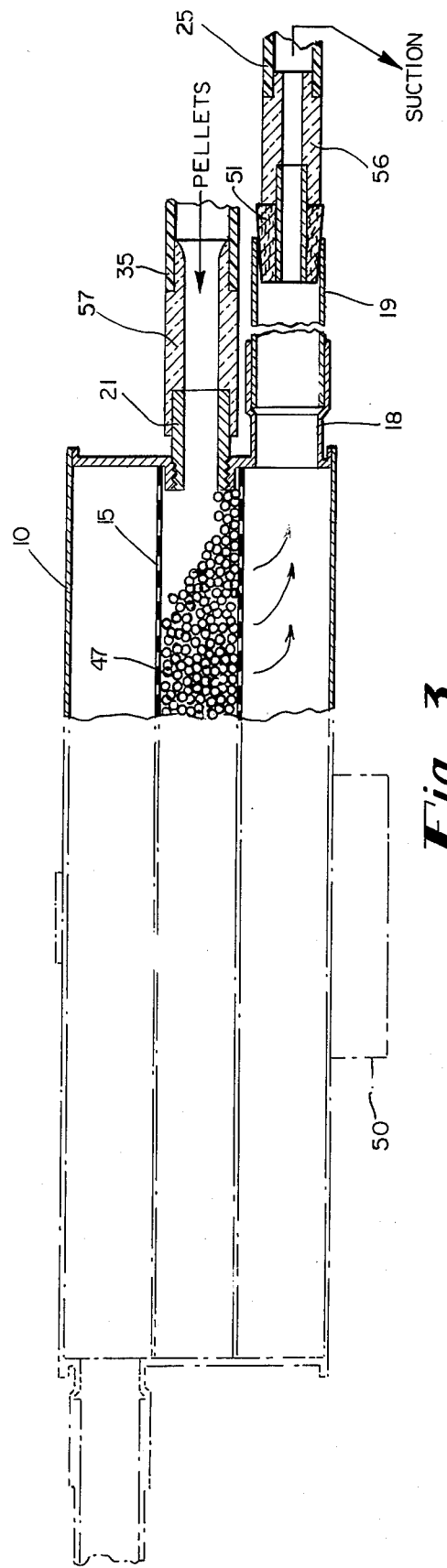

METHOD AND APPARATUS FOR EXCHANGING CATALYST IN A CATALYTIC CONVERTER

This application is a continuation of parent application Ser. No. 240,969, filed Apr. 4, 1972, now abandoned.

BACKGROUND OF THE INVENTION

Currently, a great deal of publicity is being given to the importance of improving the quality of the air that we breathe. One souce of air pollution is, of course, the internal combustion engine which powers our automobiles, trucks and buses, and efforts have been and still are being made to purify the exhaust gases emitted from the internal combustion engine. Exhaust purifiers have been developed, such as those disclosed in U.S. Pat. Nos. 3,053,773, 3,184,291 and 3,295,565, each of which is assigned to the assignee of the present application.

In U.S. Pat. No. 3,053,773, a method is disclosed of rejuvenating a catalyst exhaust purifier employed with an internal combustion engine operated on leaded gasoline. The purifier includes a bed of catalyst pellets of activated metal oxide impregnated with a catalytically active metal. The method of rejuvenation includes vibrating the purifier within a selected frequency range and within a selected range of amplitudes to dislodge dust and particles of lead compounds from the catalyst pellets and from the internal structural parts of the purifier. A fluid is passed through the interior of the purifier and through the bed of catalyst pellets during the vibrating to entrain the dust and particles and exhaust them from the purifier. A solution of a salt of the metal with which the metal oxide is impregnated is flowed into the catalyst bed and the catalyst pellets are soaked with said solution. Salt introduced to the catalyst pellets by said solutions is decomposed by passing a reducing gas through the bed at a temperature of from about 400°F. to about 1,000°F.

In U.S. Pat. No. 3,184,291, a system is disclosed for filling and emptying a catalytic exhaust purifier which includes means for vibrating the purifier and a flexible hose for flowing catalyst pellets gravitationally from a supply canister to the catalyst bed area to fill the purifier. To empty the purifier, pellets from the bed area are caused to flow by gravity to the canister. A vacuum assist is provided by a blower which places the bed under negative pressure on filling the area to promote the flow of the pellets into the bed area. The same blower is used to place the canister under negative pressure and the bed area under positive pressure on emptying the bed area to promote the flow of catalyst from the bed area into the canister. The negative pressure in the said U.S. Pat. No. 3,184,291 is, however, merely an assist for the gravitational flow and also for the removal of dust.

In U.S. Pat. No. 3,295,565, a blower is connected by a conduit to the catalyst bed area. A venturi portion is provided in the conduit. A screened pipe connects a supply reservoir of catalyst pellets to the venturi portion for the entrainment of pellets in the stream of air in the conduit leading from the blower to the catalyst bed area.

SUMMARY OF THE INVENTION

A primary object of the present invention is to provide a system for emptying and refilling the catalytic pellet bed area of an exhaust purifier of an internal combustion engine without the necessity of employing gravitational flow for the pellets, thereby to avoid the necessity to incline the conduit in one direction for emptying the bed area and in another direction for filling the bed area.

Another object of the invention is to provide a system for emptying and refilling the catalytic bed area of a catalytic exhaust purifier which does not require a venturi.

A further object is to provide a system for emptying and refilling the pellet bed area of a catalytic exhaust purifier of an internal combustion engine by employing negative pressure to suck the contaminated pellets from the bed area and negative pressure to pull fresh catalytic pellets from a supply container into the bed area, in each case along non-gravitational flow paths.

Yet another object is to provide a system in which dust may be removed from the catalytic pellets in the bed area by opening the fill port and establishing a vacuum at the tail pipe of the exhaust system.

BRIEF DESCRIPTION OF THE DRAWINGS

FIG. 2 is an enlarged view, in section, looking along the line 2—2 of FIG. 1 showing the connections when the contaminated pellets are being extracted by suction from the bed area.

FIG. 3 is a view, in section, similar to that of FIG. 2 but showing the connections when the fresh pellets are being drawn by suction from the fresh supply container into the pellet bed area of the purifier housing.

DETAILED DESCRIPTION OF THE PREFERRED EMBODIMENTS

Figure 1:
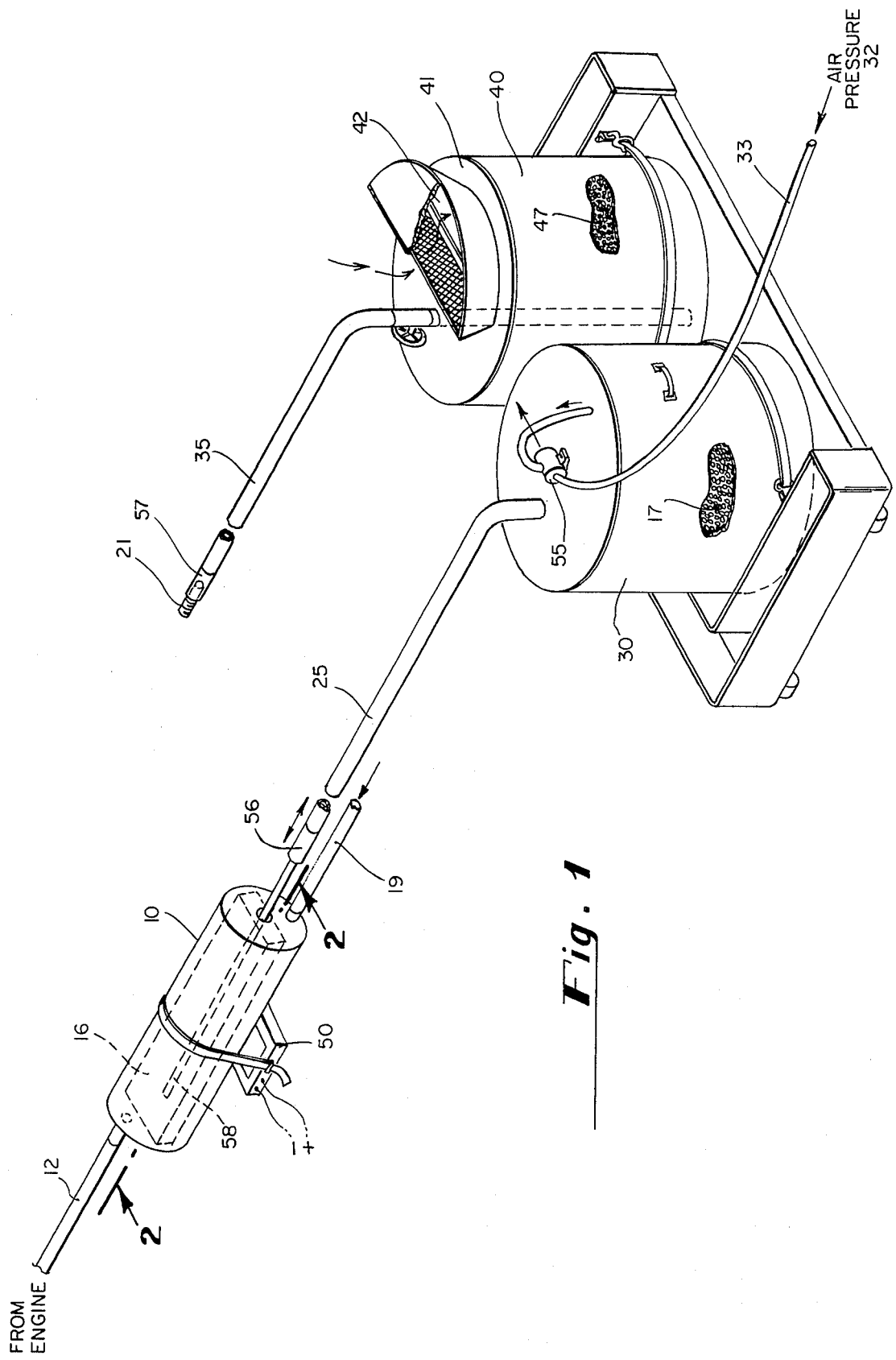
FIG. 1 is a schematic representation of the system of the present invention. The connection illustrated in FIG. 1 is that employed for sucking the contaminated pellets out of the bed area of the purifier housing.

Referring now to FIGS. 1 and 2, a purifier shell or housing 10, usually of oval or cylindrical configuration, is supported from the underframe of the motor vehicle and exhaust gases from the internal combustion engine of the vehicle flow through a conduit 12 into the input port 14 of the purifier housing 10.

Supported within the housing 10 are a pair of grids 15 defining a hollow rectangular bed area 16 containing a bed of catalyst pellets or particles 17 of activated metal oxide impregnated with a catalytically active metal. Exhaust gases which enter the purifier housing 10 through the input port 14 pass through the bed of catalyst pellets 17 and exhaust from the housing 10 through the exhaust port 18 to which the tail pipe 19 is attached.

The rectangular bed area 16 defined by the grids 15 is closed at the input end of the housing 10 by the end wall 11 and is normally closed at the exhaust end by an externally threaded solid plug which is received in the threaded opening 18' of the end wall 13 at the exhaust end of the housing 10.

When, after extended use, the catalytic pellets 17 are so covered with dirt and dust and other contaminants that their effectiveness has been decreased to the point where replacement with clean pellets is necessary or desirable, the solid fillplug in the threaded opening 18' is removed leaving an opening through which a hollow wand, such as wand 58, is inserted into the pellet bed area 16 defined by the pair of grids 15.

Referring to FIG. 1, to extract the contaminated pellets 17, the hollow vacuum line 25 leads to and through the lid or cover of a tank or canister 30 which is either completely empty or which has sufficient space therein to receive the pellets 17 which are to be withdrawn from the pellet bed area 16 of the purifier housing 10. It is contemplated that the operation of extracting contaminated pellets from the purifier and refilling the purifier with fresh pellets will ordinarily be performed in a gasoline service station. Such stations ordinarily have a compressor for providing compressed air, and accordingly, the negative pressure or vacuum which is employed, according to the present invention, to extract the soiled pellets, and to inject fresh pellets, may conveniently be derived from the compressed air supply. In FIG. 1, compressed air from a source 32 is applied through a hose 33 to an air motor 55 which discharges air in the direction indicated by the arrow in FIG. 1 and sucks air from the interior of the canister 30. The negative pressure thus created in canister 30 is applied through hollow vacuum line 25 to the pellet bed area 16.

It should be understood that before the negative pressure or vacuum is applied to the hollow vacuum line 25 to extract the soiled pellets 17 from the bed area 16, the internal combustion motor of the vehicle is shut off. In some vehicles, a venturi or aspirator will be found mounted on the conduit 12 leading to the input port 14 of the purifier housing 10, the purpose being to supply air to the exhaust gases to facilitate combustion in the pellet bed area. If the vehicle is so equipped, such venturi or aspirator should be closed before the negative pressure is applied to the wand 58 to extract the pellets.

At the start of the pellet extraction work, the attendant will push the wand 58 but slightly into the bed area 16. The pellets at the exhaust end of the purifier housing are sucked out first from the bed area 16 through the hollow tube or wand 58, and as pellets are extracted, the attendant continues to push the wand 58 more and more deeply into the bed area. If this were not done, the negative pressure in the wand 58 would suck air in through the exhaust tail pipe 19 and through the holes in the grid 15 into the wand 58, bypassing the pellets at the forward end of the bed area 16 and hence failing to withdraw or extract the same. This bypass action is avoided by the attendant maintaining a steady inward thrust on the wand 58 to keep it close to the pellets, as is illustrated schematically in FIG. 2. This action is continued until all of the soiled pellets 17 have been removed from the bed area 16 and deposited in the canister 30.

To refill the bed area 16 with fresh pellets after it has been emptied, the following procedure is followed: An exhaust pipe adapter 51, FIG. 3, having a hole therethrough is inserted into the end of the exhaust tail pipe 19. The wand 58 is removed from adapter 56 of vacuum line 25 and the adapter 56 is connected to the exhaust pipe adapter 51. A second hollow fill line 35 leads through a lid 41 to the bottom of a bulk container 40 which contains a supply of clean catalyst pellets 47. The lid 41 of the container 40 contains a vent 42 through which air may be drawn into the interior of the container 40. Compressed air from the compressed air supply 32 is applied through the hose 33 to operate the air motor 55 to suck air from the interior of the canister 30 and thus applies a negative pressure or vacuum to the hollow line 25. It has been assumed that collection canister 30 is substantially less than full of soiled extracted pellets 17.

The fill line 35 is connected to an adaptor 57 which fits over the outer end of a hollow tubular adaptor 21 which is threaded into the opening 18'.

During the refill portion of the operation, the internal combustion motor is shut down and any aspirator or venturi is closed. The vacuum or negative pressure applied to vacuum line 25 causes clean pellets 47 from the fresh supply in the bulk container 40 to be drawn up through the fill line 35 and into the bed area 16. This action continues until the entire bed is filled with fresh pellets 47. The vacuum and fill lines 35 and 25 are then removed, as well as adapters 51 and 21. The solid plug is then threaded into the opening 18' in the wall 13 of the purifier housing 10 to close the pellet bed area 16.

Only a short period is required for the entire cycle of extracting the contaminated pellets 17 from the purifier housing and refilling the bed area with fresh pellets 47. There is no need to incline or tilt either the extraction hose or the fill hose, nor is there any need to incline the motor vehicle itself, in order to achieve extraction and refilling of the pellet bed area. The negative pressure or vacuum provided is sufficient to extract and to insert the pellets from and into the purifier housing along non-gravitational paths. The negative pressure required is readily available at the service station, being provided by the compressed air pump.

In some cases, the soiled pellets 17 may tend to stick to each other in bunches, and it may be necessary to assist their extraction by shaking or vibrating the purifier housing 10. This may be done as by a vibrator or shaker 50 which may be strapped to the purifier shell or housing as illustrated in FIG. 1.

In some cases, where test or analysis of the exhaust gases have indicated that the purifier is not fully effective it may be possible to correct the condition by removing dust and dirt from the pellets and bed area by opening the fill port and establishing a negative pressure at the exhaust pipe.

What is claimed is:

1. A system for emptying and filling with catalyst particles a catalytic exhaust purifier having a housing having an exhaust port, said housing containing a catalyst bed area having a fill hole communicating therewith, said system comprising:
   a. a first container adapted to receive particles extracted from said catalyst bed area of said purifier;
   b. a second container having a supply of replacement particles;
   c. first conduit means connected to said receiving container;
   d. second conduit means connected to said supply container;
   e. a source of negative pressure;
   f. means applying negative pressure to said receiving container;
   g. means for selectively connecting said first conduit means to the fill hole of said bed area to apply negative pressure to said bed area for extracting particles therefrom and to deposit the extracted particles into said receiving container and thereafter connecting said first conduit means to said exhaust port of said housing and connecting said second conduit to said fill hole of said bed area for extracting particles from said supply container into said bed area, at least one said first and second conduits in association with said bed area constituting a nongravitational flow path for said particles.

2. A method of selectively depleting and replenishing with catalyst particles a catalytic exhaust purifier having a housing having an exhaust port and containing a catalyst bed area having a fill hole communicating therewith, said method comprising the steps of:
   a. applying negative pressure to a particle-receiving container and through a first conduit extending from said receiving container to the fill hole of said bed area for extracting particles from the bed area and then transferring said first conduit and said negative pressure means from said fill hole to the exhaust port of said purifier and connecting the fill hole of said bed area through a second conduit to a container containing a supply of replacement particles for drawing said replacement particles from said supply container through said second conduit into said bed area, at least one of said first and second conduits being disposed in association with said bed area along a nongravitational flow path for said particles.

3. The method according to claim 2 wherein said particles are drawn by suction along substantially horizontal paths.

4. The method according to claim 2 wherein said exhaust purifier is vibrated to assist in the extraction of said particles.

5. The method according to claim 3 wherein said exhaust purifier is vibrated to assist in the extraction of said particles.

6. A system according to claim 1 wherein means are provided for shaking said exhaust purifier.

7. The method according to claim 2 wherein said exhaust purifier is vibrated to assist in the deposit of said replacement particles.

8. The method according to claim 3 wherein said exhaust purifier is vibrated to assist in the deposit of said replacement particles.

9. A system for emptying and filling with catalyst particles a catalytic exhaust purifier having a housing having an exhaust port, said housing containing a catalyst bed area having a fill hole communicating therewith, said exhaust port not being within said bed area, said system comprising:
   a. a first container adapted to receive catalytic particles extracted from said catalyst bed area of said purifier;
   b. a second container having a supply of replacement catalytic particles;
   c. first conduit means connected to said receiving container;
   d. second conduit means connected to said supply container;
   e. a source of negative pressure;
   f. means applying said negative pressure to said receiving container;
   g. means for selectively connecting said first conduit means to the fill hole of said bed area to apply negative pressure to said bed area for extracting particles therefrom and to deposit said extracted particles into said receiving container and thereafter for connecting said first conduit means to said exhaust port of said housing and connecting said second conduit to said fill hole of second bed area for drawing particles from said supply container into said bed area.

10. A method of selectively withdrawing and introducing catalyst particles from and into a catalytic exhaust purifier having a housing having an exhaust port and a catalyst particle bed area having a fill hole, said exhaust port not being within said bed area, said method comprising the steps of:
   a. applying negative pressure to a particle-receiving container through a first conduit extending from said receiving container to the fill hole of said particle bed area for extracting particles from the bed area and then
   b. transferring said first conduit and said negative pressure means from said fill hole to the exhaust port of said purifier,
   c. connecting the fill hole of said bed area through a second conduit to a container containing a supply of catalytic particles, and
   d. drawing said catalytic particles from said supply container under the influence of negative pressure through said second conduit into said bed area.

* * * * *